US010767719B2

(12) United States Patent
Jang et al.

(10) Patent No.: US 10,767,719 B2
(45) Date of Patent: Sep. 8, 2020

(54) APPARATUS AND METHOD FOR ASSEMBLING COMPOSITE MATERIAL LEAF SPRING MODULE

(71) Applicants: HYUNDAI MOTOR COMPANY, Seoul (KR); KIA MOTORS CORPORATION, Seoul (KR)

(72) Inventors: Hyun Seok Jang, Daegu (KR); Seung Hyun Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 266 days.

(21) Appl. No.: 15/615,462

(22) Filed: Jun. 6, 2017

(65) Prior Publication Data
US 2018/0172100 A1 Jun. 21, 2018

(30) Foreign Application Priority Data
Dec. 15, 2016 (KR) .................. 10-2016-0171744

(51) Int. Cl.
*F16F 1/368* (2006.01)
*B60G 11/10* (2006.01)
*B60G 11/02* (2006.01)

(52) U.S. Cl.
CPC ............ *F16F 1/3683* (2013.01); *B60G 11/02* (2013.01); *B60G 11/10* (2013.01);
(Continued)

(58) Field of Classification Search
CPC ........... F16F 1/18; F16F 1/3683; B60G 11/02; B23P 19/048
(Continued)

(56) References Cited

U.S. PATENT DOCUMENTS 3,428,378 A * 2/1969 Divine .................. F16C 43/086
384/515
3,944,175 A * 3/1976 Kearney ................. E21F 17/02
248/59
(Continued)

FOREIGN PATENT DOCUMENTS

CN 102179690 A * 9/2011
CN 103831778 A * 6/2014
(Continued)

OTHER PUBLICATIONS

Machine Translation of CN-102179690-A (Year: 2011).*
Machine Translation of CN-103831778-A (Year: 2014).*
Machine Translation of CN-104875147-A (Year: 2015).*

*Primary Examiner* — Jacob J Cigna
*Assistant Examiner* — Michael W Hotchkiss
(74) *Attorney, Agent, or Firm* — McDonnell Boehnen Hulbert & Berghoff LLP

(57) ABSTRACT

The present disclosure relates to an apparatus and a method for assembling a composite material leaf spring module, wherein the efficiency of assembly of the composite material leaf spring module is improved and a camber of a spring member of a composite material is compensated for during assembly. An apparatus for assembling a composite material leaf spring module includes a first support configured to support a central portion of the composite material leaf spring module, a pair of second supports configured to individually support springs of the composite material leaf spring module, and a base connecting the first and second supports.

11 Claims, 9 Drawing Sheets

(52) U.S. Cl.
CPC .... *B60G 2200/31* (2013.01); *B60G 2204/121* (2013.01); *F16F 2226/04* (2013.01)

(58) Field of Classification Search
USPC ........................................................ 29/896.91
See application file for complete search history.

(56) References Cited

U.S. PATENT DOCUMENTS

| | | | | |
|---|---|---|---|---|
| 5,119,543 | A * | 6/1992 | Reilly | B60G 5/053 |
| | | | | 280/124.17 |
| 5,876,000 | A * | 3/1999 | Ismert | E03C 1/021 |
| | | | | 248/65 |
| 5,971,654 | A * | 10/1999 | Sweeney, Jr. | B60G 9/003 |
| | | | | 280/686 |
| 6,189,904 | B1 * | 2/2001 | Gentry | B60G 11/08 |
| | | | | 267/149 |
| 6,554,265 | B2 * | 4/2003 | Andronica | B25B 1/2452 |
| | | | | 269/268 |
| 8,141,826 | B1 * | 3/2012 | Gallardo | F16L 3/243 |
| | | | | 248/74.4 |
| 8,540,263 | B2 * | 9/2013 | Pizzeta | B60G 5/03 |
| | | | | 280/124.175 |
| 8,827,289 | B2 * | 9/2014 | Dilworth | B60G 11/10 |
| | | | | 280/124.111 |
| 9,849,744 | B2 * | 12/2017 | Girelli Consolaro | |
| | | | | B60G 11/107 |
| 2005/0006535 | A1 * | 1/2005 | Brown | H02G 3/32 |
| | | | | 248/70 |
| 2012/0146310 | A1 * | 6/2012 | Fruhmann | B60G 21/026 |
| | | | | 280/124.175 |

FOREIGN PATENT DOCUMENTS

| | | | |
|---|---|---|---|
| CN | 104875147 A | * | 9/2015 |
| KR | 10-1989-0003100 B | | 8/1989 |
| KR | 10-1995-0011880 A | | 5/1995 |
| KR | 10-1997-0011420 A | | 3/1997 |

* cited by examiner

APPARATUS AND METHOD FOR ASSEMBLING COMPOSITE MATERIAL LEAF SPRING MODULE

CROSS-REFERENCE TO RELATED APPLICATION

This application is based on and claims the benefit of and priority to Korean Patent Application No. 10-2016-0171744, filed on Dec. 15, 2016, in the Korean Intellectual Property Office, the disclosure of which is incorporated herein in its entirety by reference.

TECHNICAL FIELD

The present disclosure relates to an apparatus and a method for assembling a composite material leaf spring module, and more particularly to an apparatus and a method for assembling a composite material leaf spring module by which the camber of a spring member of a composite material may be compensated for and the efficiency with which the composite material leaf spring module is assembled may be improved.

BACKGROUND

A suspension of a vehicle is adapted to improve the ride feeling and protect a vehicle body by absorbing impacts delivered from a road surface through tires and an axle during driving of the vehicle.

The vehicle suspension is configured to absorb impacts delivered to the vehicle body through deformation such as deflection of the leaf spring while enduring the load of the vehicle body, by using a structure in which opposite ends of several leaf springs are fixed to the axle and a central portion of the suspension is installed in the vehicle body.

The conventional leaf spring may be formed of steel, and may be configured such that several leaf spring members are stacked.

In recent years, composite material leaf springs formed of a composite material such as fiber-reinforced plastic ("FRP"), instead of steel, have been used.

Because the conventional composite material leaf spring has a camber of a specific angle due to the material characteristics of the composite material, it is very difficult to assemble the composite material leaf spring.

SUMMARY OF THE DISCLOSURE

The present disclosure has been made to solve the above-mentioned problems occurring in the prior art while advantages achieved by the prior art are maintained intact.

An embodiment of the present disclosure provides an apparatus and a method for assembling a composite material leaf spring module wherein the efficiency of assembling the composite material leaf spring module may be improved by conveniently arranging the components of the composite material leaf spring module.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for assembling a composite material leaf spring module may include a first support configured to support a central portion of the composite material leaf spring module, and a pair of second supports configured to individually support springs of the composite material leaf spring module.

The first support may include a pair of symmetrically disposed side walls, and a connection wall connecting the pair of side walls.

An insertable support may extend forwards from the connection wall, and a lower saddle of the composite material leaf spring module may be inserted into the insertable support.

Each of the second supports may include a support member configured to support a lower surface of the corresponding spring, and an upper surface of the support member may have an inclined surface having an associated inclination angle.

A U-bolt retainer may be separably installed on the first support. The U-bolt retainer may maintain the U-bolts in specific installation positions, and the U-bolts may couple an upper saddle and the lower saddle of the composite material leaf spring module.

The U-bolt retainer may include at least one pair of guides separably coupled to side walls of the first support, and each of the guides may have a guide surface contacting the U-bolt.

Each of the guides may have a recess accommodating an upper end of the side wall.

A guide may be coupled to the upper end of the side wall using any suitable connector, such as a dowel pin, and the connector may be inserted through the guide and the side wall.

A connection member may be connected to the upper end of the guide using a connection rod, and the connection member may have a pressure plate configured to press against the upper saddle of the composite material leaf spring module.

According to another aspect of the present disclosure, a method for assembling a composite material leaf spring module by using the apparatus described above may include supporting the lower saddle of the composite material leaf spring module and the spring member by the first support, supporting the springs of the composite material leaf spring module by the second supports, and coupling the lower saddle and the upper saddle of the composite material leaf spring module using the U-bolts.

The method may further include arranging the lower saddle in the first support to support the lower saddle by the first support, by inserting the insertable support into the lower saddle.

The method may further include locating the spring member of the composite material leaf spring module on the lower saddle and arranging the spring member such that a center of the spring member coincides with a center of the lower saddle.

The method may further include arranging the upper saddle and the lower saddle on and under a central portion of the spring member by positioning the upper saddle on the central portion of the spring member, and coupling the upper saddle and the lower saddle using the U-bolts.

The method may further include fixedly supporting the springs on the second supports by fixing the spring to the support members of the second supports using connectors such as dowel pins.

The method may further include coupling the springs supported by the second supports to the spring member using a coupler.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the sizes of the components and the thickness of the lines of the drawings may be exaggerated for convenience of understanding. Further, the terms used in the description of the present disclosure may be different according to the users, the intentions of the operators, or the customs in consideration of the functions in the present disclosure. Therefore, definition of the terms should be made according to the overall disclosure set forth herein.

Figure 1:
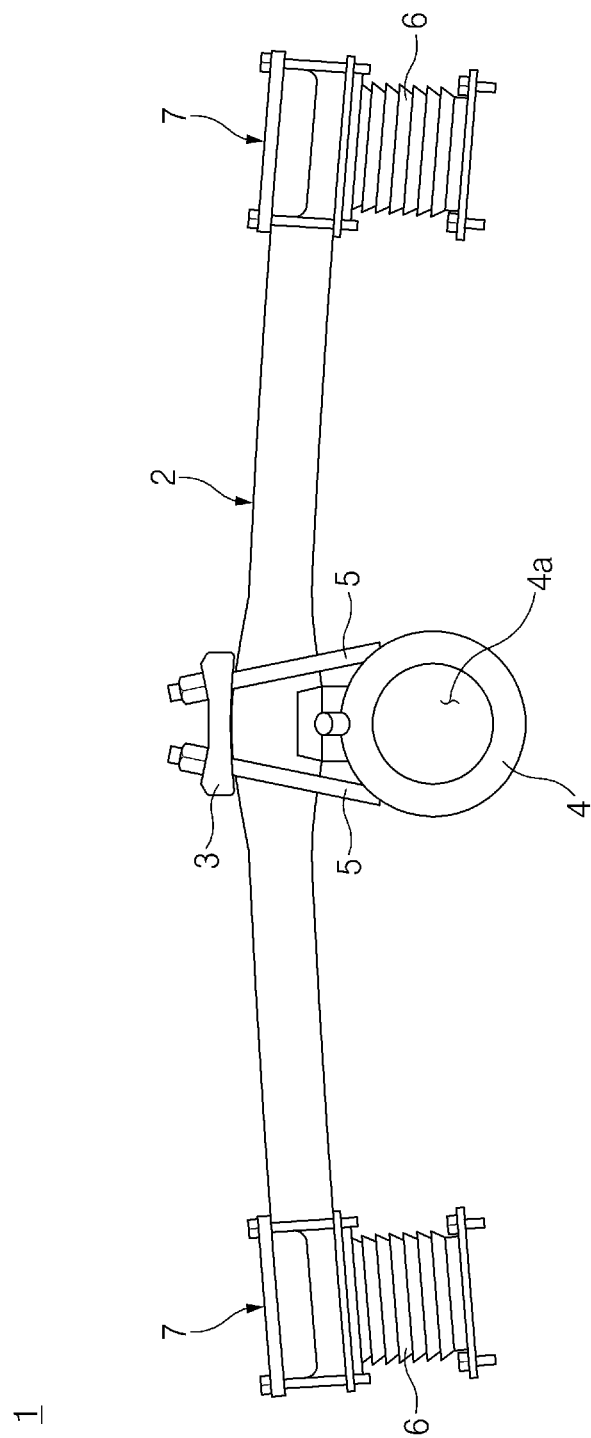
FIG. 1 is a perspective view illustrating a composite material leaf spring module.

FIG. 1 illustrates a composite material leaf spring module 1, including a spring member 2 formed of a composite material such as FRP.

Spring member 2 may have an inclined camber due to the characteristics of the composite material.

An upper saddle 3 and a lower saddle 4 may be disposed at the center of spring member 2, and upper saddle 3 and lower saddle 4 may be coupled to each other by a pair of U-bolts 5.

Upper saddle 3 may be disposed atop a central portion of spring member 2, and lower saddle 4 may be disposed under the central portion of spring member 2. Lower saddle 4 may have a cylindrical structure having a hollow 4a at the center thereof.

Springs 6 may be made of any suitable material such as tuber and may be coupled to opposite ends of spring member 2 using couplers 7.

An apparatus 10 for assembling a composite material leaf spring module according to the present disclosure may be applied not only to example assembly of the composite material leaf spring module 1 of FIG. 1 but also to other composite material leaf spring modules having various structures.

Figure 2:
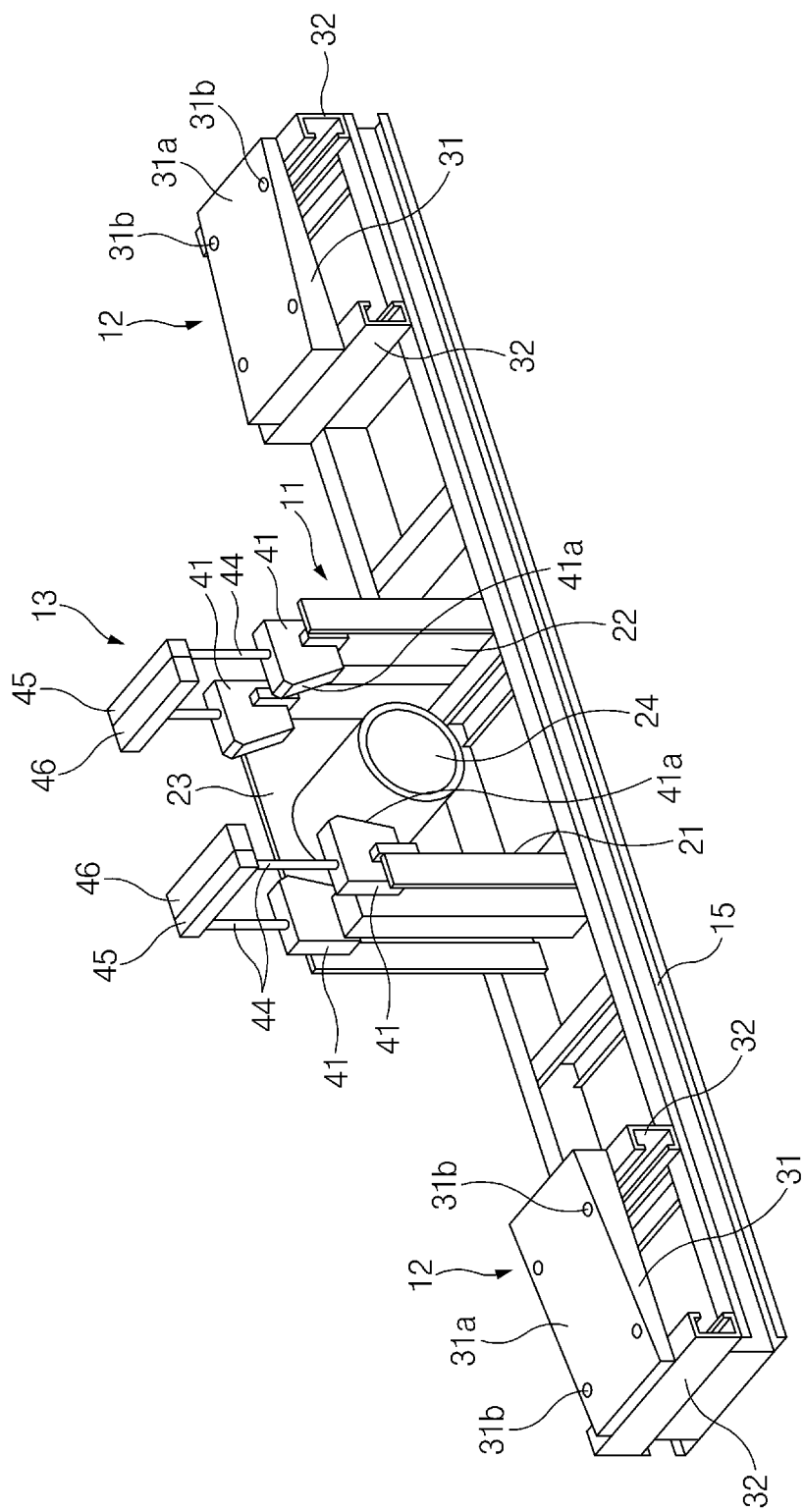
FIG. 2 is a perspective view illustrating an apparatus for assembling a composite material leaf spring module according to an embodiment of the present disclosure.
Figure 3:
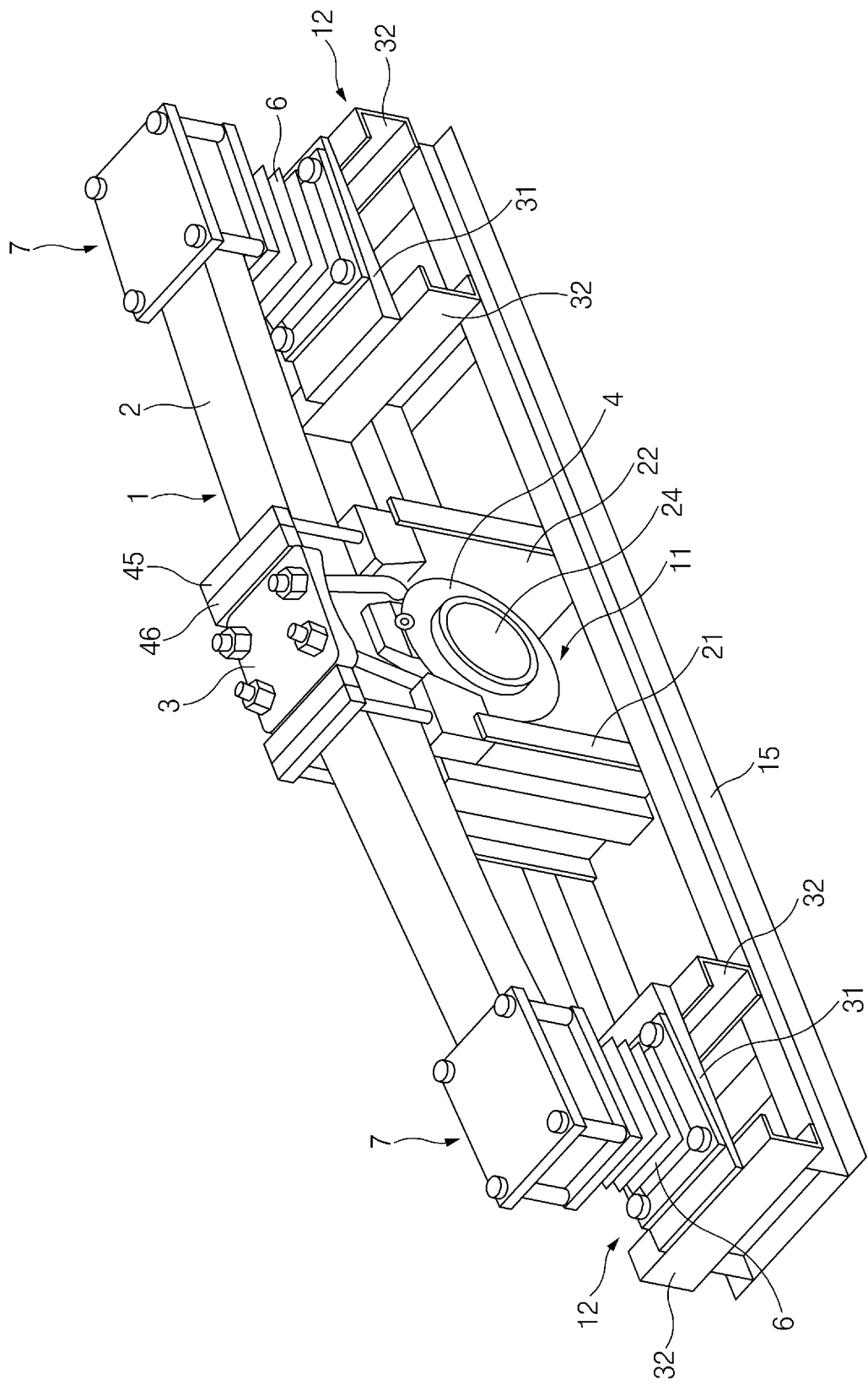
FIG. 3 is a perspective view illustrating a composite material spring module assembled in the apparatus for assembling a composite material leaf spring module according to an embodiment of the present disclosure.

Referring to FIGS. 2 and 3, apparatus 10 for assembling a composite material leaf spring module according to the embodiment of the present disclosure includes a base frame 15, a first support 11 located at the center of base frame 15, a pair of second supports 12 disposed at opposite ends of base frame 15, and a U-bolt retainer 13 installed on and separable from first support 11.

Base frame 15 may have a length corresponding to the length of the composite material leaf spring module 1.

First support 11 may be installed at the center of base frame 15, and may be configured to support a central portion of spring member 2 of the composite material leaf spring module 1 as the lower saddle 4 is inserted.

As shown in the embodiment in FIG. 2, first support 11 includes a pair of spaced oppositely disposed side walls 21 and 22, and a connection wall 23 connecting the pair of side walls 21 and 22.

As illustrated in FIG. 3, a central portion of spring member 2 may be symmetrically seated on upper surfaces of side walls 21 and 22, allowing side walls 21 and 22 of the first support 11 to stably support the central portion of the spring member 2. In this embodiment, upper saddle 3 may be located on the upper surface of the central portion of spring member 2 while being supported by side walls 21 and 22.

An insertable support 24 may extend from connection wall 23 and the central portion of composite material leaf spring module 1 may be stably arranged and supported by assembling apparatus 10 of the present disclosure as insertable support 24 is inserted into lower saddle 4 of composite material leaf spring module 1. By doing so, lower saddle 4 and upper saddle 3 may be stably coupled to each other using the U-bolt 5.

Insertable support 24 has an outer surface whose shape and size correspond to the shape and size of the inner surface of lower saddle 4, to allow insertable support 24 to be easily inserted into lower saddle 4. As exemplified in FIG. 1, when lower saddle 4 has a cylindrical structure having hollow 4a, insertable support 24 has a corresponding cylindrical structure. In the embodiment of FIG. 1, the inner diameter of insertable support 24 may be the same as the outer diameter of lower saddle 4 or may be slightly less than the outer diameter of lower saddle 4. Because lower saddle 4 is fitted around and supported by the outer surface of insertable support 24, composite material leaf spring module 1 may be separated (demounted) very easily after being completely assembled.

The pair of second supports 12 may be disposed at opposite ends of base frame 15 and may be configured to fixedly support springs 6.

Figure 7:
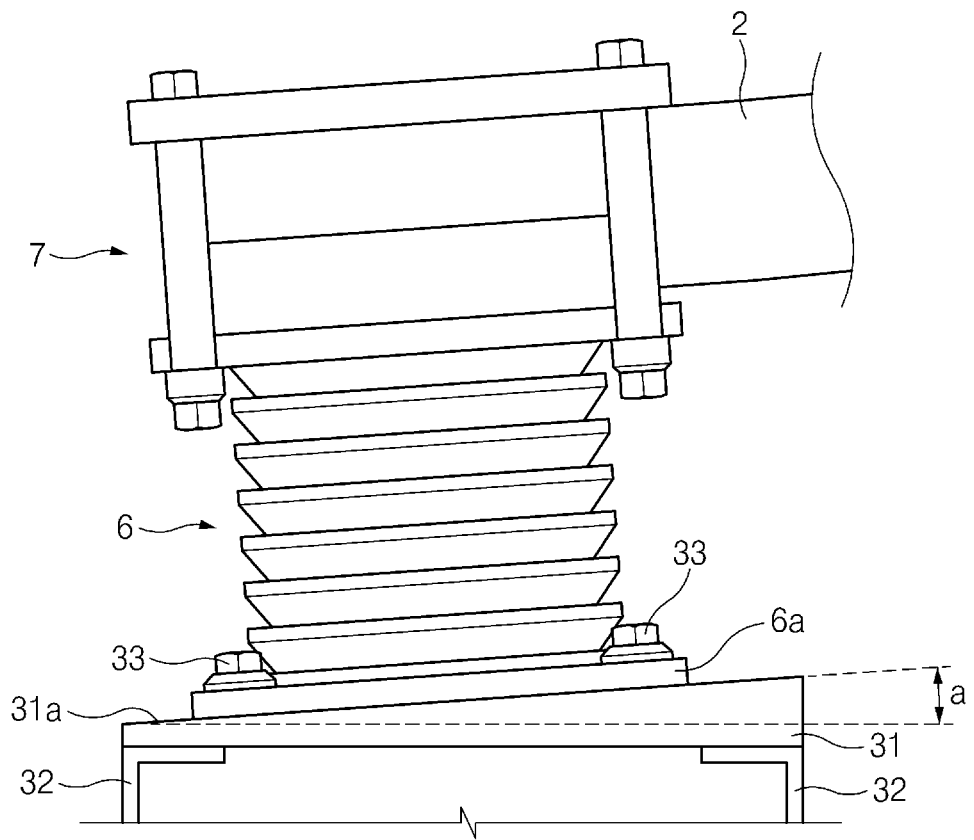
FIG. 7 is an enlarged view of box A of FIG. 6.

Each of the second supports 12 includes a support member 31 that supports a lower surface of spring 6, and, as illustrated in FIG. 7, support member 31 may have an inclined upper surface 31a inclined at a specific angle (a).

The inclination angle (a) of inclined surface 31a may be set to correspond to an initial camber of spring member 2. For example, when the designed camber of spring member 2 is 4.5°, the inclination angle (a) of the inclined surface 31a also may be 4.5°.

As illustrated in FIG. 2, support member 31 has one or more fixing holes 31b, and as illustrated in FIG. 7, as a connector 33, such as a bolt or a dowel pin, passes through a lower plate 6a of spring 6 and is inserted into the fixing holes 31b, spring 6 may be fixedly supported by inclined surface 31a of support member 31.

A pair of fixing blocks 32 may be fixed to ends of base frame 15 by welding or other suitable methods, and support members 31 of second supports 12 also may be fixed to support blocks 32 by welding or other suitable methods.

As illustrated in FIGS. 2 and 3, a U-bolt retainer 13 may be installed on and separable from first support 11, and the U-bolt retainer 13 may be configured to maintain the U-bolts 5 in a specific (designed) installation position when the U-bolts 5 are coupled.

U-bolt retainer 13 may include at least one pair of guides 41 detachably coupled to side walls 21 and 22 of the first support 11.

The at least one pair of guides 41 may be installed on side walls 21 and 22 of first support 11 so that they face each other from the left and right sides.

Figure 8:
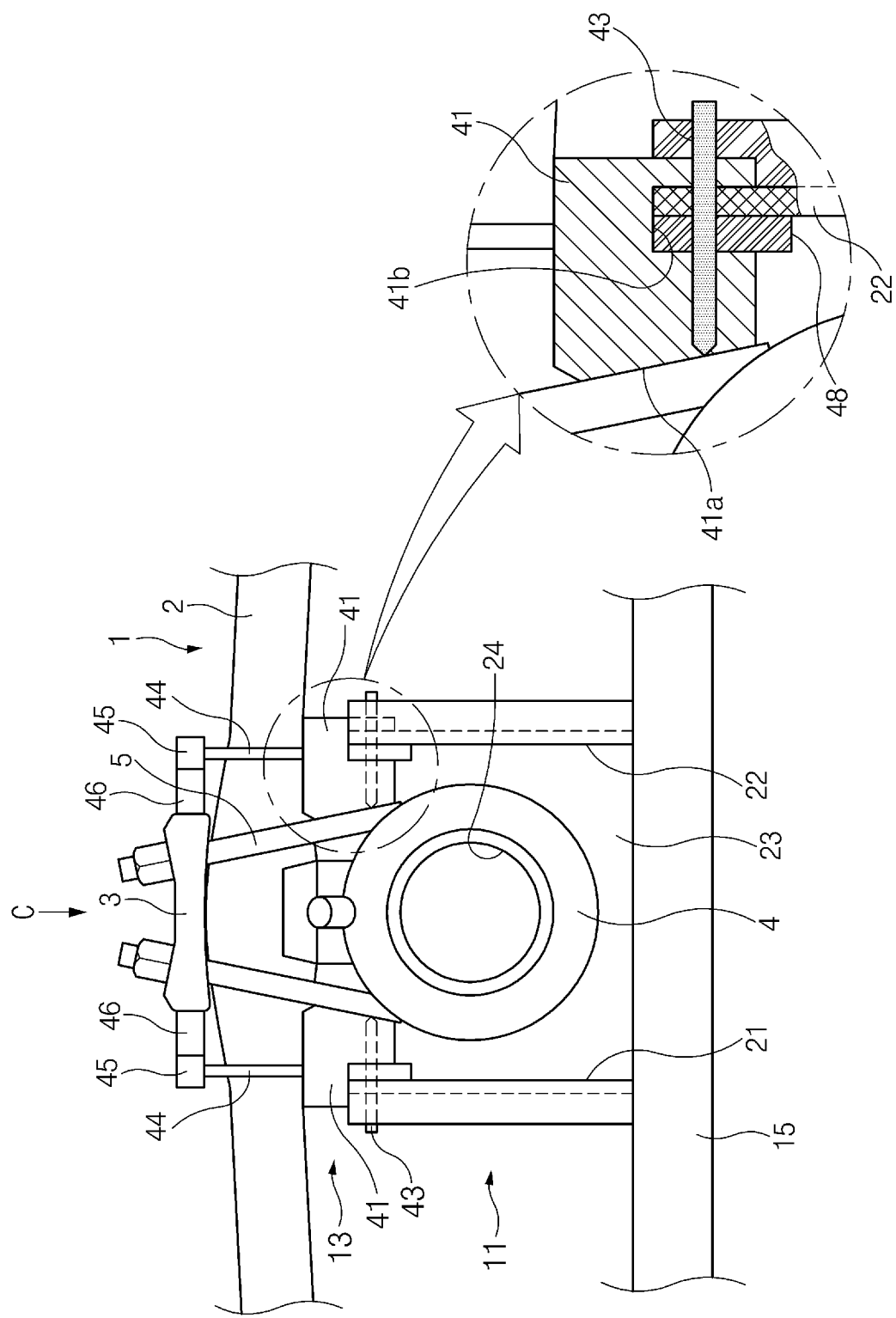
FIG. 8 is an enlarged view of box B of FIG. 6.

As shown in FIG. 8, each of the guides 41 may have a guide surface 41a that guides the corresponding U-bolt 5 so that the U-bolt 5 maintains a designed position.

For example, as exemplified in FIG. 1, when U-bolts 5 are set (designed) to be inclined at a specific angle, guide surfaces 41a of guides 41 may be correspondingly inclined. On the other hand, when the U-bolts 5 are set (designed) to be vertical, guide surfaces 41a of guides 41 are vertical to correspond to the installation positions of the U-bolts 5.

The number of guides 41 may correspond to the number of installed U-bolts 5. Furthermore, when two U-bolts 5 are installed on the front and rear sides of the composite material leaf spring module 1, as illustrated in FIG. 2, two pairs of guides 41 also may be installed on the front and rear sides.

Referring to FIG. 8, guides 41 may have a recess 41b accommodating a portion of the corresponding side wall 21 or 22.

A reinforcement 48 that reinforces the strength of corresponding side wall 21 or 22 may be attached to an upper end of side wall 21 or 22 by welding or another suitable method. In such an embodiment, recess 41b of guide 41 accommodates both reinforcing member 48 and side wall 21 or 22.

Guide 41 also may be separably coupled to an upper end of the side wall 21 or 22 using a connector such as a dowel pin 43. Dowel pin 43 may pass through guide 41, recess 41b, side wall 21 or 22, and reinforcement 48 so that guide 41 is separably coupled to the upper end of side wall 21 or 22.

U-bolt retainer 13 may further include a pair of spaced oppositely disposed connection members 45, each connection member 45 may be connected to the upper end of one or more guides 41 using a connection rod 44. Guides 41 that are adjacent to each other along either side wall 21 or 22 may be connected to each other by each connection member 45.

Figure 9:
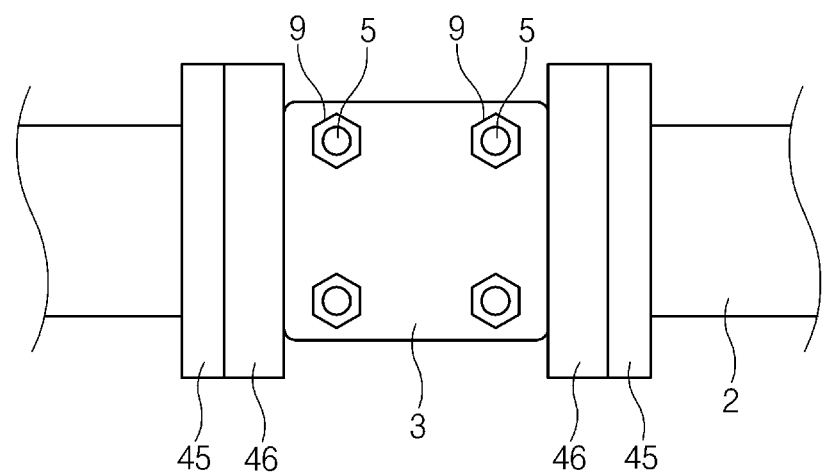
FIG. 9 is a view from the direction of arrow C of FIG. 8.

As illustrated in FIGS. 8 and 9, a pressure plate 46 extending towards a side surface of the upper saddle 3 may be affixed to each of connection members 45, and accordingly, as illustrated in FIG. 9, a pair of pressure plates 46 may press against the left and right side surfaces of upper saddle 3.

As the opposite side surfaces of upper saddle 3 are pressed by pressure plates 46, upper saddle 3 may be prevented from being dislocated, when U-bolts 5 are inserted through upper saddle 3 and fixed with any suitable component such as a nut.

Hereinafter, a method for assembling the composite material leaf spring module 1 according to the embodiment of the present disclosure is described in detail with reference to FIGS. 4 through 6.

Figure 4:
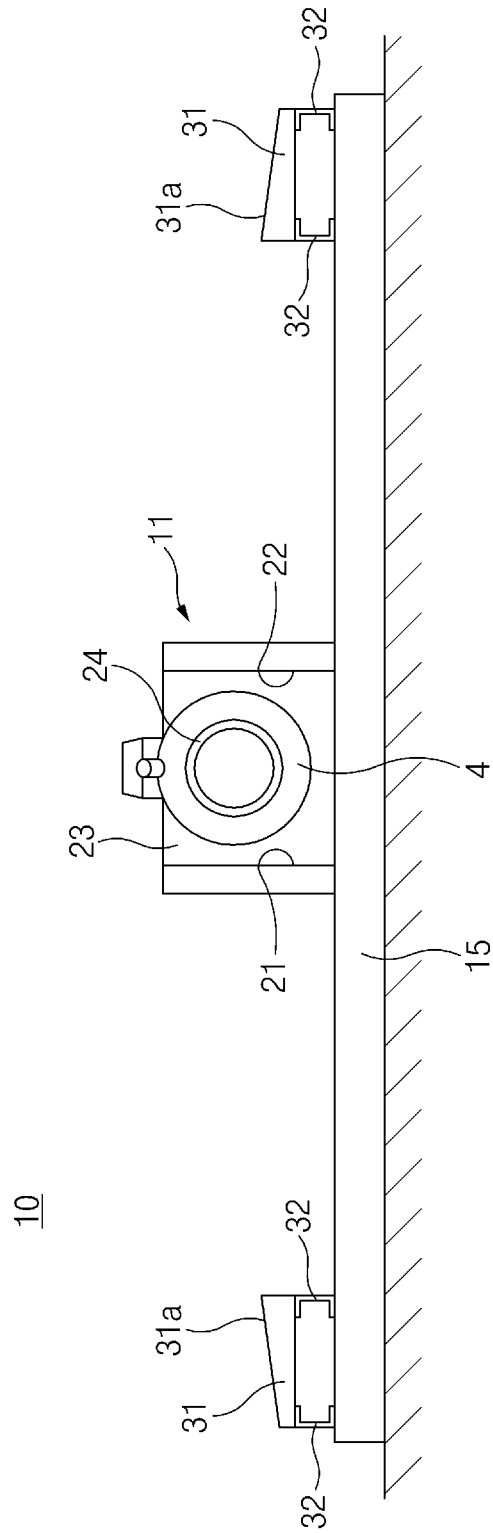
FIG. 4 is a front view illustrating the apparatus for assembling a composite material leaf spring module according to an embodiment of the present disclosure.

As illustrated in FIG. 4, as lower saddle 4 of composite material leaf spring module 1 is positioned around insertable support 24 of first support 11, lower saddle 4 of the composite material leaf spring module 1 is arranged in and supported by the first support 11.

Figure 5:
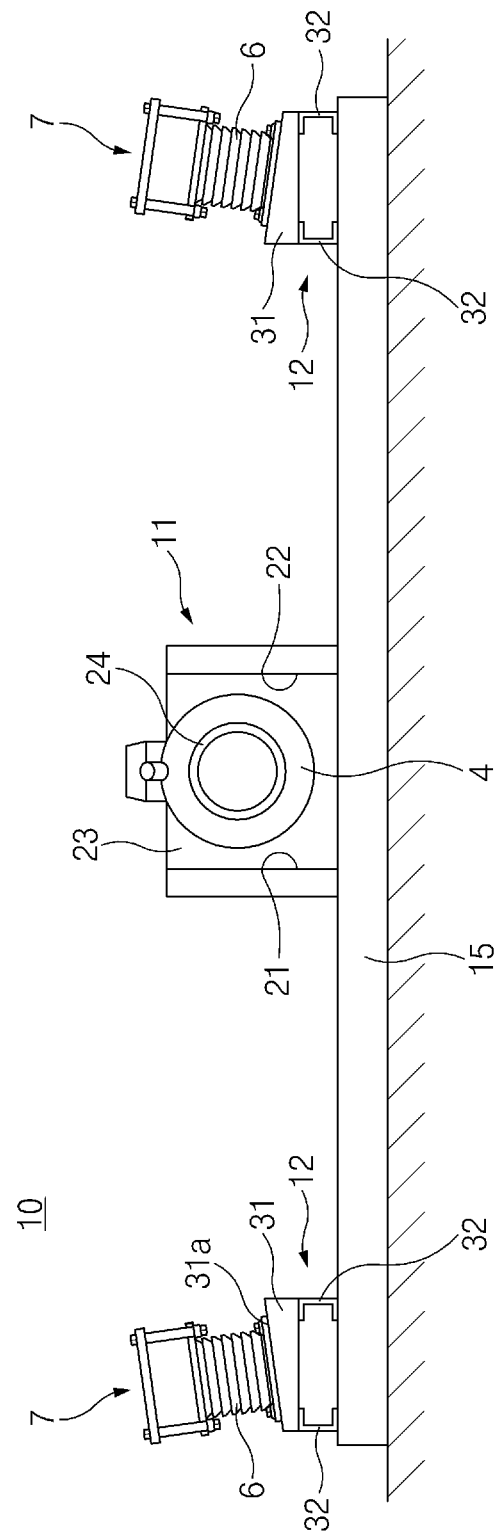
FIG. 5 is a view illustrating a spring assembled in a second support unit of the apparatus for assembling a composite material leaf spring module according to an embodiment of the present disclosure.

Then, as illustrated in FIG. 5, springs 6 are fixed to support members 31 of second supports 12 using dowel pins 33, such that springs 6 are fixedly supported by the second supports 12.

Figure 6:
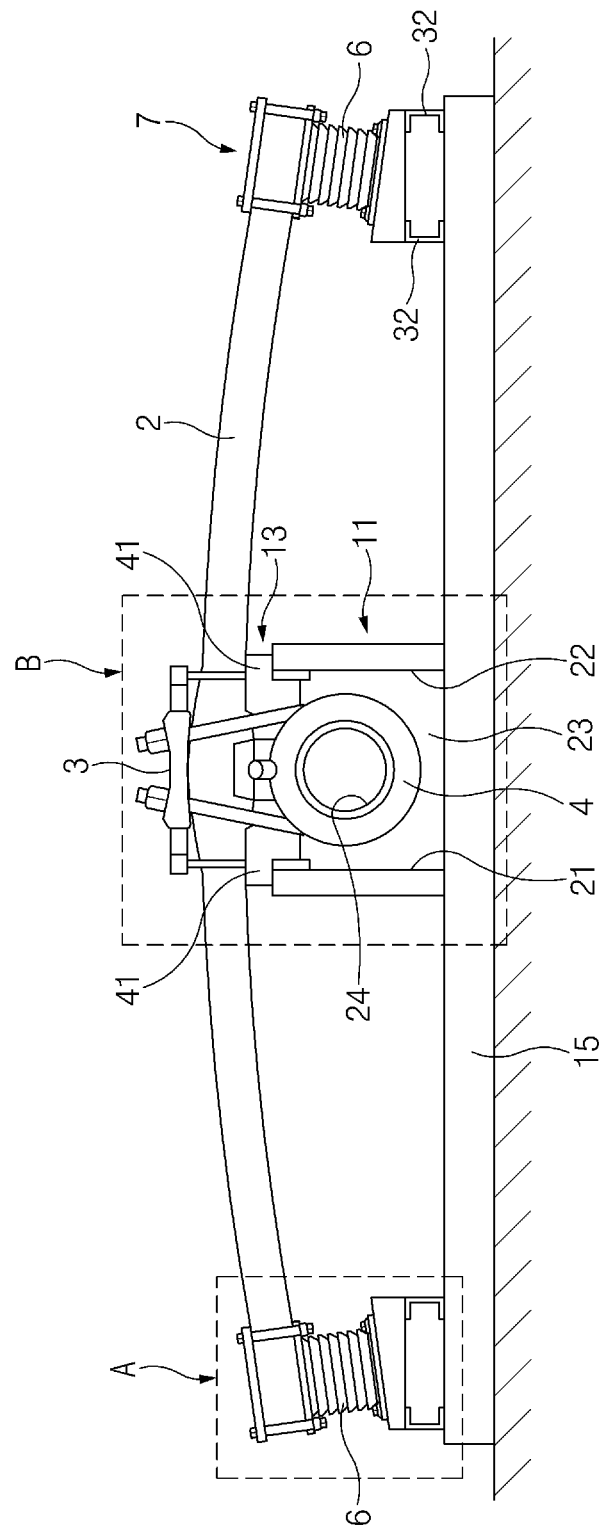
FIG. 6 is a view illustrating a lower saddle of the composite material leaf spring module assembled in a first support of the apparatus for assembling a composite material leaf spring module according to an embodiment of the present disclosure.

Thereafter, as illustrated in FIG. 6, spring member 2 of composite material leaf spring module 1 is positioned on lower saddle 4. A central portion of spring member 2 is positioned on side walls 21 and 22 of first support 11, and accordingly, the central portion of spring member 2 is symmetrically supported by side walls 21 and 22 of first support 11.

Thereafter, spring member 2 is positioned such that the center of spring member 2 is aligned with the center of lower saddle 4. Furthermore, springs 6 are coupled to opposite ends of spring member 2 by couplers 7.

After upper saddle 3 and lower saddle 4 are arranged on and under the central portion of spring member 2, respectively, by positioning upper saddle 3 on an upper surface of the central portion of spring member 2, upper saddle 3 and lower saddle 4 are coupled to each other using U-bolts 5. Assembly of composite material leaf spring module 1 is completed by coupling lower saddle 4 and upper saddle 3 by using U-bolts 5, and then composite material leaf spring module 1 is separated (demounted) from assembling apparatus 10.

According to the present disclosure, the efficiency of assembling composite material leaf spring module 1 may be improved by conveniently arranging the components of composite material leaf spring module 1 and compensating for the camber of the spring member.

Although detailed embodiments of the present disclosure have been described, the present disclosure is not limited to the embodiments disclosed in the specification and the accompanying drawings, and the present disclosure may be variously modified by those skilled in the art without departing from the technical spirit of the present disclosure.

What is claimed is:

1. An apparatus for assembling a composite material leaf spring module, the apparatus comprising:
   a first support configured to support a central portion of the composite material leaf spring module, wherein the leaf spring module includes a spring member, an upper saddle disposed atop a central portion of the spring member, a lower saddle disposed under the central portion of the spring member, and a U-bolt coupling the upper saddle and the lower saddle;
   a pair of second supports configured to individually support springs of the composite material leaf spring module;
   a base connecting the first and second supports; and
   a U-bolt retainer separably installed on the first support;
   wherein the first support includes a pair of symmetrically disposed side walls, and a connection wall connecting the pair of side walls;
   wherein an insertable support extends from the connection wall;
   wherein the lower saddle has a cylindrical structure having a hollow, the insertable support has a corresponding cylindrical structure, and the insertable support is inserted into the hollow of the lower saddle;
   wherein the U-bolt retainer includes at least one pair of guides detachably coupled to the side walls of the first support, a pair of spaced, oppositely disposed connection members, and a pair of pressure plates;
   wherein each connection member of the pair of connection members is connected to the upper end of a corresponding one of the pair of guides through a connection rod, and each pressure plate of the pair of pressure plates extends from the corresponding one of the pair of guides toward a side surface of the upper saddle;

wherein each of the guides has a guide surface contacting the U-bolt; and wherein the guide surface is inclined.

2. The apparatus of claim 1, wherein each of the second supports includes a support member configured to support a lower surface of the corresponding spring, and wherein the support member has an upper surface inclined at an inclination angle.

3. The apparatus of claim 1, wherein each of the guides has a recess configured to accommodate an upper end of the side wall.

4. The apparatus of claim 3, wherein the guide is separably coupled to the upper end of the side wall by inserting a dowel pin through the guide and the side wall.

5. The apparatus of claim 4, further comprising a pair of connection members connected to the upper end of the guide by a connection rod, wherein each of the pair of connection members includes a pressure plate configured to press against an upper saddle of the composite material leaf spring module.

6. A method for assembling a composite material leaf spring module by using the apparatus claimed in claim 1, the method comprising:

supporting a lower saddle of the composite material leaf spring module and the spring member by the first support;

supporting springs of the composite material leaf spring module by the second support units; and coupling the lower saddle and an upper saddle of the composite material leaf spring module using U-bolts.

7. The method of claim 6, further comprising:

fixedly supporting the springs on the second supports by fixing the spring to the support members of the second supports using dowel pins.

8. The method of claim 7, further comprising:

coupling the springs supported by the second supports to the spring member using a coupler.

9. The method of claim 6, further comprising:

inserting the insertable support into the lower saddle.

10. The method of claim 9, further comprising:

locating the spring member of the composite material leaf spring module on the lower saddle and arranging the spring member such that a center of the spring member is aligned with a center of the lower saddle.

11. The method of claim 10, further comprising:

arranging the upper saddle and the lower saddle on and under a central portion of the spring member by positioning the upper saddle on the central portion of the spring member, and coupling the upper saddle and the lower saddle using the U-bolts.

* * * * *